Aug. 3, 1943.    B. J. FROST    2,325,847
SNAP FASTENER
Filed Aug. 31, 1940

Inventor
Bernard J. Frost
By Fred Gerlach
Atty.

Patented Aug. 3, 1943

2,325,847

UNITED STATES PATENT OFFICE 2,325,847

SNAP FASTENER

Bernard J. Frost, Chicago, Ill., assignor to Richards, Boggs & King, Inc., Chicago, Ill., a corporation of Delaware Application August 31, 1940, Serial No. 355,020

1 Claim. (Cl. 24—217)

The present invention relates generally to snap fasteners. More particularly the invention relates to that type of snap fastener which serves releasably to hold together or in connected relation a pair of overlapping or adjoining flexible sheet-like members and comprises a male part on one of the members and a female part on the other member.

In opening a snap fastener of this type difficulty is often experienced because the female part which is contractile or contractive, grips the male part with a comparatively large amount of inward pressure. In some cases the person desiring to open the fastener will pull apart the members to which the fastening parts are secured and if strong force is employed the parts are often pulled out of connected relation with the members. In other instances the person desiring to open the fastener will if difficulty is encountered in separating the members insert his or her finger nails between the two fastener parts and often on exerting outward force break or otherwise injure the nails.

The primary object of the present invention is to provide a snap fastener which embodies simple and novel means whereby the male and female parts may be readily separated without any likelihood of the person opening the fastener stripping the fastener parts from the members to which they are attached or connected or injuring his or her finger nails.

Another object of the invention is to provide a snap fastener of the type and character last mentioned in which the means for facilitating opening or separation of the male and female parts comprises a pair of doubled back fabric tabs which are associated with the parts respectively and are adapted in connection with opening of the fastener to be gripped and pulled apart.

A further object of the invention is to provide a snap fastener of the type and character under consideration in which the doubled back fabric tabs constituting the means for facilitating opening of the fastener parts are of different length in order that they may be readily gripped in connection with opening of the fastener.

A still further object of the invention is to provide a snap fastener which is generally of new and improved construction and has certain advantages over previously designed fasteners of like type or character.

Other objects of the invention and the various advantages and characteristics of the present snap fastener will be apparent from a consideration of the following detailed description.

The invention consists in the several novel features which are hereinafter set forth and are more particularly defined by the claim at the conclusion hereof.

In the drawing which accompanies and forms a part of this specification or disclosure and in which like letters numerals of reference denote corresponding parts throughout the several views.

Figure 1:
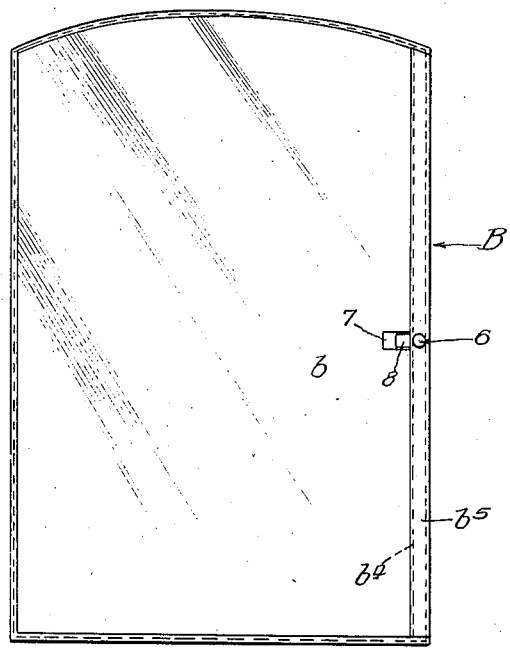
Figure 1 is a front view of a garment bag having applied to certain of the side margins thereof a snap fastener embodying the invention.

The snap fastener which is shown in the drawing constitutes the preferred form or embodiment of the invention. It comprises as the parts thereof a male part 5, a female part 6 and a pair of tabs 7 and 8 for opening or separating the parts 5 and 6, and is shown or illustrated in connection with a garment bag B. The latter is of conventional or standard design and comprises a front $b$ and a coextensive back $b^1$. The front and back of the bag are stitched together along their bottom margins and also along the side margins thereof at one side of the bag. They are also stitched together along the top margins thereof and have a central hole or aperture adjacent the central portions of their top margins in order to accommodate the hook of a hanger. The side margin of the front $b$ at the other side of the bag is doubled back and provided with a longitudinally extending line of stitching $b^2$ to form a hem $b^3$. The adjacent side margin of the back $b^1$ of the bag is adapted to be folded into lapped relation with the hem equipped side margin of the front $b$ for bag sealing purposes and is doubled back and provided with a longitudinally extending line of stitching $b^4$ in order to form a hem $b^5$. The snap fastener, as illustrated in the drawing, serves as a medium for releasably securing together the hem equipped side margins of the front and back of the bag B. Except for the tabs 7 and 8 the fastener is of conventional or standard design and construction. The male part 5 of the fastener is associated with the hem equipped side margin of the bag front b and consists of a stamped metal outer piece 9 and a stamped metal inner piece 10. The outer piece 9 fits against the outer face of said hem equipped margin of the bag front b and is centrally deformed to form a dome shaped head 11. It is circular, as shown in the drawing, and is flat except for the dome shaped head 11. The inner piece 10 of the male part 5 underlies the piece 9 and fits against the inner face of the hem equipped side margin of the bag front b. It is circular as far as shape or conformation is concerned and embodies an upstruck dome shaped head 12 at its central portion. The head 12 extends through a hole 13 in the hem equipped side margin of the bag front b and fits within the interior of the dome shaped head 11 of the outer piece 9 of the male part 5 in such manner that the two pieces 9 and 10 are locked together in clamped relation with said hem equipped side margin of the bag front b.

Figure 3:
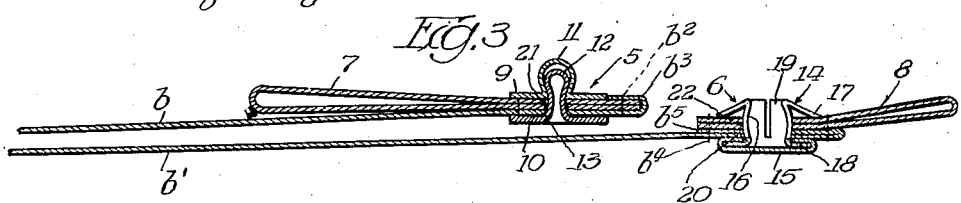
Figure 3 is a section taken on the line 3—3 of Figure 2 and disclosing the manner in which the doubled back fabric tabs are attached to the fastener parts.
Figure 4:
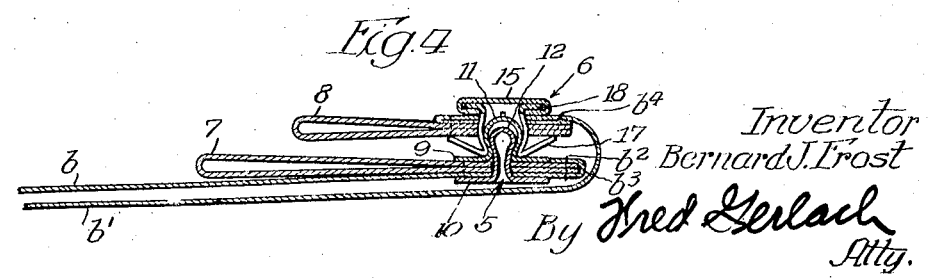
Figure 4 is a section illustrating the male and female parts of the fastener in their closed position showing the arrangement and position of the tabs.

The female part 6 of the fastener is associated with the hem equipped side margin of the bag back $b^1$ and consists of a stamped metal socket piece 14 and a stamped metal cap 15. It is positioned adjacent the male part 5 and is adapted, as hereinafter described, to snap into connected relation with said male part and thus secure the hem equipped side margins of the front and back of the back in a closed or sealed position. The socket piece 14 of the female part 6 consists of a substantially cylindrical body 16 and a pair of outwardly extending annular end flanges 17 and 18. The body 16 is outwardly bulbed and defines as far as its inner periphery is concerned, a restricted entrance type socket 19 for the dome shaped head 11 of the outer piece 9 of the male part 5. It extends through a hole 20 in the hem $b^5$, as shown in Figure 3, and is longitudinally slit so that it is expansible and contractible. The flange 17 is at the inner end of the body 16 and the flange 18 is at the other or outer end of the body. The cap 15 of the female part 6 fits against the outer face of the flange 18 and has its margin bent inwards around the latter so that it is maintained in connected relation with the socket piece 14. The two flanges 17 and 18 straddle the hem $b^5$ and hence hold the female part 6 in connected relation with the hem. The cap 15 serves to close the outer end of the socket 19. When it is desired to secure together the two hem equipped side margins of the front and back of the bag the female part 6 of the fastener is manipulated into contacting relation with the inner piece 9 of the male part 5 and is pressed inwards in order to cause the dome shaped head 11 of the piece 9 to snap into the socket 19. When the dome shaped head 11 of the outer piece 9 of the male part is in the socket 19 in the body of the socket piece of the female part 6 the two parts of the fastener are maintained in connected relation. Opening of the fastener is effected by separating or pulling apart the male and female parts, as well understood in the art.

Figure 2:
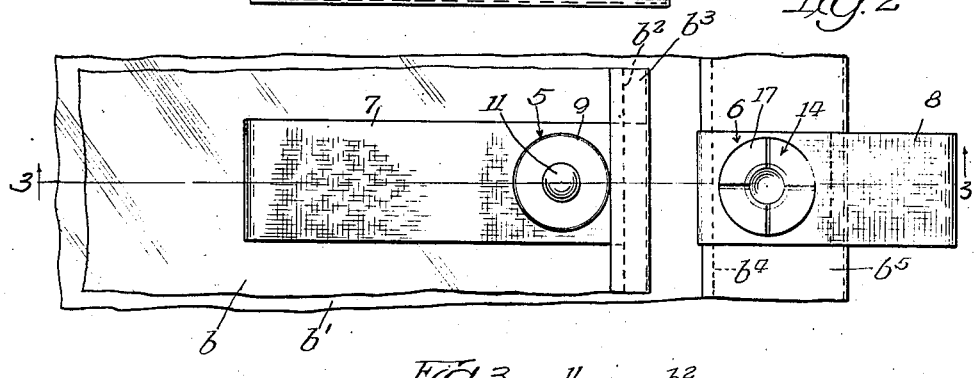
Figure 2 is an enlarged plan view showing the male and female parts of the fastener in their open or separated positions and illustrating in detail the design and character of the doubled back fabric tabs which constitute the means for facilitating opening of the fastener.

The tabs 7 and 8 constitute means for facilitating opening of the male and female parts 5 and 6. The tab 7 is associated with the male part and is in the form of a double back fabric strip. The inner ends of the tab 7 have aligned holes 21 through which the dome shaped head 12 of the inner piece 10 extends. They are clamped between the inner and outer pieces 9 and 10 of the male part 5 and are secured to the adjacent portion of the hem equipped side margin of the bag front b by the stitching $b^2$, as shown in the drawing. The tab 7 projects inwardly from the hem $b^3$ and is approximately four times as long as the male part is wide. It is adapted to be gripped between the thumb and first finger and provides ready means for separating the male part 5 from the female part in connection with opening of the fastener. The tab 8 is associated with the female part 6 and is formed of a doubled back or U-shaped fabric strip. The ends of the tab 8 have aligned holes 22 through which the body of the socket piece 14 extends. They are clamped against the hem $b^5$ by the flange 17 of the socket piece 14 and are secured in place by the stitching $b^4$. The tab 8 is so arranged that when the female part 6 of the fastener is swung or manipulated into connected relation with the male part it overlies the tab 7, as shown in Figures 1 and 2. It is adapted to be gripped between the thumb and first finger and serves as a medium for separating the female part of the fastener from the male part. As shown in the drawing the tab 8 is shorter than the tab 7. Because of this the two tabs may be quickly and readily gripped in connection with opening of the fastener. By having the ends of the tabs anchored in place by stitching the tabs are locked or held against rotation relatively to the male and female parts of the fastener.

The male and female parts of the fastener are adapted to be connected together by snapping them in place as previously pointed out. When it is desired to separate the two members the tabs 7 and 8 are grasped one in one hand and one in the other hand and then pulled apart. This action serves to separate the male and female parts. By employing two tabs and having them associated respectively with the male and female parts of the fastener there is little, if any, likelihood of the male and female parts being stripped or pulled from the members to which they are attached when they are opened or separated. Another advantage of employing or providing two tabs is that the person opening the male and female parts of the fastener is not likely to injure his or her finger nails.

The herein described snap fastener effectively and efficiently fulfills its intended purpose and is characterized by the fact that it embodies novel means whereby the male and female parts thereof may be quickly and readily separated.

Whereas the snap fastener has been described in connection with a garment bag it is to be understood that it may be used in connection with other articles or items having overlapping margins. It is also to be understood that the invention is not to be restricted to the details set forth since these may be modified within the scope of the appended claim without departing from the spirit and scope of the invention.

Having thus described the invention what I claim as new and desire to secure by Letters Patent is:

A new article of manufacture comprising a snap fastener designed releasably to secure together a pair of normally overlapping flexible sheet-like members and consisting of a head equipped male part and a complemental socket equipped female part connected to said members respectively and adapted to be snapped together into interlocked relation, and means for facilitating separation or opening of the parts in connection with release of the members consisting of a comparatively long tab in the form of a doubled back fabric strip having the ends thereof apertured to receive, and fixedly secured to, one of the parts and stitched to the member to which the one part is connected and its folded portion free for gripping purposes, and a shorter tab separate from the first mentioned tab and in the form of a doubled back fabric strip having its ends apertured to receive, and fixedly secured to, the other part and stitched to the member to which said other part is connected and its folded portion free for gripping purposes, the second mentioned tab being positioned and arranged so that when the two parts are snapped together it is in lapped relation with said first mentioned tab and its folded portion is disposed inwards of the folded portion of said first mentioned tab.

BERNARD J. FROST.